(12) United States Patent
Karidis

(10) Patent No.: US 6,262,881 B1
(45) Date of Patent: Jul. 17, 2001

(54) COMPACT NOTEBOOK COMPUTER WITH MOVABLE KEYBOARD SECTION

(75) Inventor: John P. Karidis, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,301

(22) Filed: Mar. 31, 1999

(51) Int. Cl.[7] .................... G06F 1/16; H05K 5/02; B41J 5/10
(52) U.S. Cl. .................. 361/680; 400/682; 400/489; D14/100; D14/106; D14/107
(58) Field of Search ................... 361/679–686, 361/724–727; 312/233.1, 223.2; 400/82, 682, 691, 692, 693, 488, 489; 341/22; 345/168; D14/100, 107, 106

(56) References Cited

U.S. PATENT DOCUMENTS

| D. 337,102 | * | 7/1993 | Spayde et al. ............... D14/106 |
| D. 372,465 | | 8/1996 | Karidis et al. . |
| D. 372,471 | | 8/1996 | Karidis et al. . |
| D. 372,472 | | 8/1996 | Karidis et al. . |
| D. 376,352 | | 12/1996 | Karidis et al. . |
| D. 384,948 | | 10/1997 | Karidis et al. . |
| 5,247,285 | * | 9/1993 | Yokota et al. ............... 345/169 |
| 5,267,127 | * | 11/1993 | Politt ............................ 361/680 |
| 5,543,787 | * | 8/1996 | Karidis et al. .............. 341/20 |
| 5,659,307 | | 8/1997 | Karidis et al. . |
| 5,682,645 | * | 11/1997 | Watabe et al. ............... 16/338 |
| 5,687,058 | * | 11/1997 | Roylance ..................... 361/680 |
| 5,708,562 | * | 1/1998 | Agata et al. .................. 361/683 |
| 5,732,910 | * | 3/1998 | Martin ......................... 284/118 |
| 5,769,551 | * | 6/1998 | Tsai et al. ..................... 361/680 |

FOREIGN PATENT DOCUMENTS 4-268907 * 9/1992 (JP) .................. G06F/1/16

* cited by examiner

*Primary Examiner*—Leo P. Picard
*Assistant Examiner*—Lea Edmonds
(74) *Attorney, Agent, or Firm*—John B. Schelkopf; Andrew Dillon

(57) ABSTRACT

A low profile, miniature notebook computer has a base portion, a monitor portion and a display monitor which is pivotally mounted to the monitor portion. The base portion and the monitor portion are movable relative to one another between retracted and deployed positions. The computer also has a keyboard with keys which are divided between the base and monitor portions. As the monitor portion is deployed, it shifts to the left and forward relative to the stationary base portion. The monitor portion may be manually or automatically shifted between positions. The computer also has a base plate with a stationary support foot which is flush with the rear edge of the main body of the machine when it is in the retracted position, but which extends beyond the rear edge of the main body of the machine when it is in the deployed position. The support foot allows heavy components such as the batteries to be located near the rear edge of the machine to keep the front edge very thin and prevent the machine from tipping over when the display is opened up beyond 90 degrees. Although the computer has a symmetric appearance when it is not in operation, the movable keyboard sections, display monitor and support foot give the computer several asymmetric features when it is in the deployed position.

19 Claims, 5 Drawing Sheets

COMPACT NOTEBOOK COMPUTER WITH MOVABLE KEYBOARD SECTION

BACKGROUND OF THE INVENTION

1. Technical Field

This invention relates in general to notebook computers and in particular to a low-profile, miniature notebook computer having a base with a segmented keyboard, wherein a portion of the keyboard is movable relative to the base.

2. Background Art

Some users of notebook computers prefer them to be very small and lightweight. Unfortunately, small notebook computers typically have smaller than normal keyboards which are more difficult to use than those of their larger counterparts. One prior art device, described in U.S. Pat. Nos. 5,659,307 and 5,543,787, solved this problem with a segmented, "butterfly-style" keyboard which deployed when the computer was opened. That computer required a rather complicated and expensive mechanism to enable automatic keyboard deployment. Moreover, it did not address the ergonomic issue of having the display positioned as far forward (toward the user) as possible to make it easier to use the computer in cramped conditions, such as on an airline seat back tray table. A notebook computer with an improved keyboard design for use under crowded conditions is needed.

SUMMARY OF THE INVENTION

A low profile, miniature notebook computer has a base portion, a monitor portion and a display monitor which is pivotally mounted to the monitor portion. The base portion and the monitor portion are movable relative to one another between retracted and deployed positions. The computer also has a keyboard with keys which are divided between the base and monitor portions. As the monitor portion is deployed, it shifts to the left and forward relative to the stationary base portion. The monitor portion may be manually or automatically shifted between positions.

The computer also has a base plate with a stationary support foot which is flush with the rear edge of the main body of the machine when it is in the retracted position, but which extends beyond the rear edge of the main body of the machine when it is in the deployed position. The support foot allows heavy components such as the batteries to be located near the rear edge of the machine to keep the front edge very thin and prevents the machine from tipping over when the display is opened up beyond 90 degrees. Although the computer has a symmetric appearance when it is not in operation, the movable keyboard sections, display monitor and support foot give the computer several asymmetric features when it is in the deployed position.

BEST MODE FOR CARRYING OUT THE INVENTION

Figure 1:
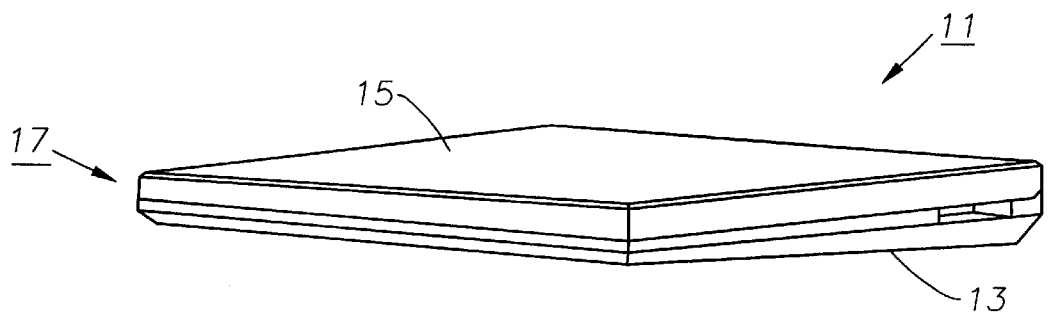
FIG. 1 is a right front isometric view of a notebook computer constructed in accordance with the invention and shown in the closed position.
Figure 2:
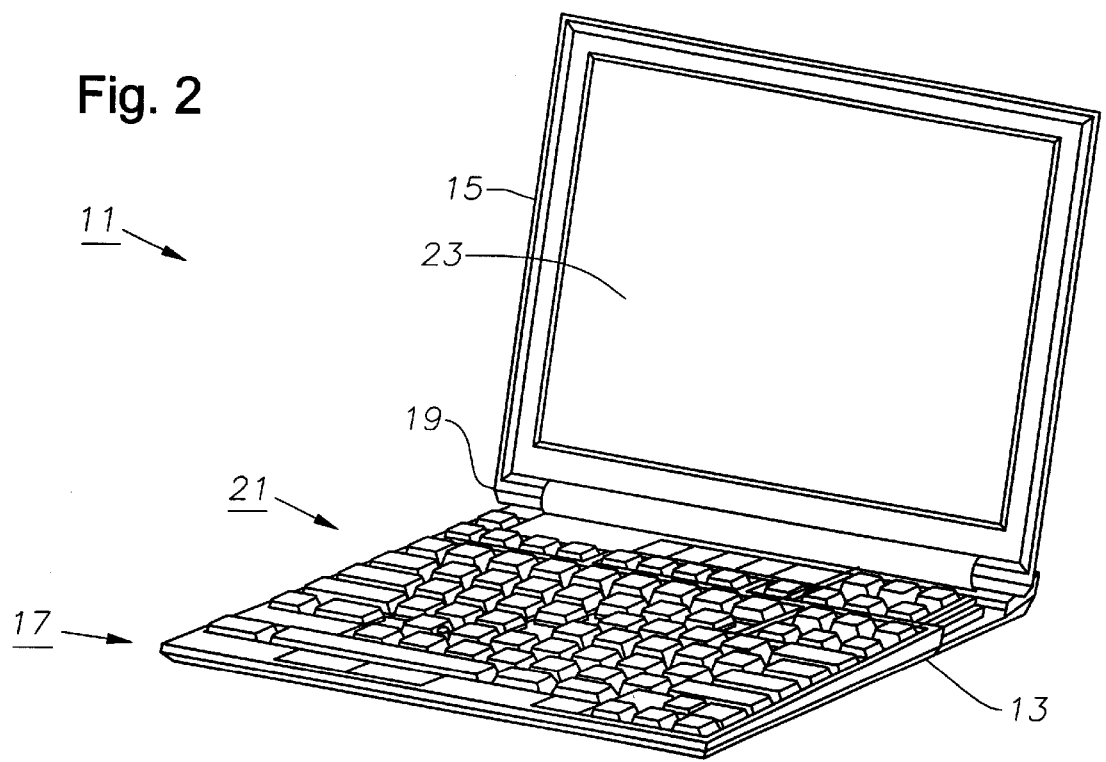
FIG. 2 is a right front isometric view of the computer of FIG. 1 with the display in an upright position.

Referring to FIGS. 1 and 2, a low profile, miniature notebook computer 11 is shown. Computer 11 has length, width and thickness dimensions which are smaller than conventional notebook computers. Computer 11 has a substantially horizontal base 13 and a pivotable lid or cover 15 on a hinge 19 near its rear edge. Cover 15 is generally uniform in thickness, but base 13 tapers in thickness from a front edge 17 to its rear edge 18. In its closed position (FIG. 1), cover 15 is latched to base 13 and is substantially horizontal. In this position, cover 15 has approximately the same surface area as base 13 and computer 11 has a wedge-like shape. Cover 15 contains a display monitor 23 on its front surface for viewing by the user. Monitor 23 is a conventional notebook computer display with an aspect ratio of approximately 4 to 3. Monitor 23 occupies substantially all of the frontal surface area of cover 15 and, thus, has a surface area which is approximately equal to the surface area of its keyboard 21.

In the embodiment shown, the front edge 17 of computer 11, including its cover 15, is very thin which minimizes the vertical distance between its keyboard 21 and the underlying support surface or desktop. Thus, the rear edge 18 is thicker than front edge 17. When pivoted to its open position (FIG. 2), cover 15 is substantially vertical, but may be adjusted to the user's preferred angle of inclination. Note that when cover 15 is initially opened, keyboard 21 has an unconventional aspect ratio that is smaller or more square in shape than the larger, rectangular aspect ratios (approximately 2 to 1) of conventional notebook keyboards.

Figure 3:
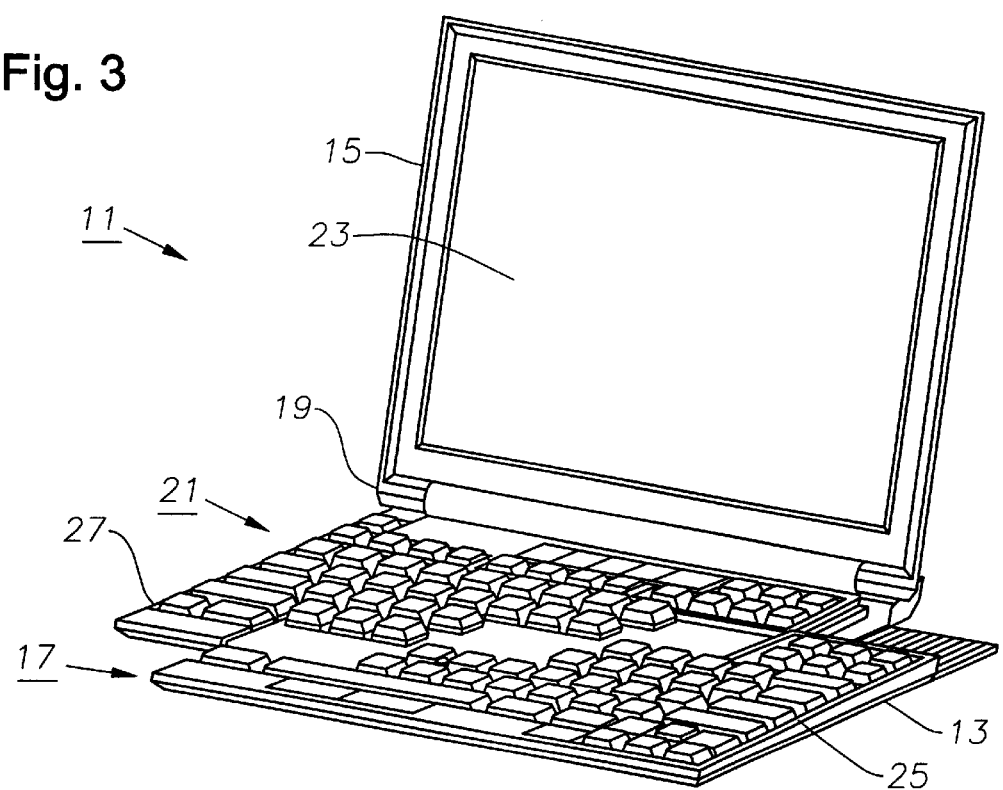
FIG. 3 is a right front isometric view of the computer of FIG. 2 shown with the monitor portion in a retracted position.

As shown in FIG. 3, keyboard 21 actually comprises a base portion 25 and a monitor portion 27 which are movable relative to one another. In the embodiment shown, portions 25, 27 each comprise about half of the keys in keyboard 21, but the "break" between portions 25, 27 may be established in many different locations. In this embodiment, the break is staggered as shown. In FIG. 3, monitor portion 27 has been partially deployed or shifted to the left by approximately two inches relative to stationary base portion 27. Monitor portion 27 has not yet moved forward or rearward relative to base portion 25. Although it is preferred that keyboard 21 be manually actuated between its retracted and deployed positions, computer 11 may be actuated automatically as well (not shown).

Note that when cover 15 is first opened up (FIG. 2) keyboard 21 is not in a conventional rectangular configuration, but rather in a square nested or retracted configuration. Although keyboard 21 is usable when portions 25, 27 are retracted, typing would be more difficult because of the misalignment. FIG. 3 also illustrates that the lower edge of cover 15 is pivotally mounted to the rear edge of monitor portion 27. Note also that the rearward most keys on monitor portion 27 are immediately adjacent to hinge 19 or the lower edge of cover 15 such that there is very little, if any, unused horizontal surface area therebetween. In addition, the keys located along the front and side edges of keyboard 21 are positioned immediately adjacent to and substantially flush with their respective edges. Here again, the unused horizontal surface area is minimized, thereby reducing the overall dimensions of computer 11. This configuration also gives computer 11 a unique visual appearance.

Figure 4:
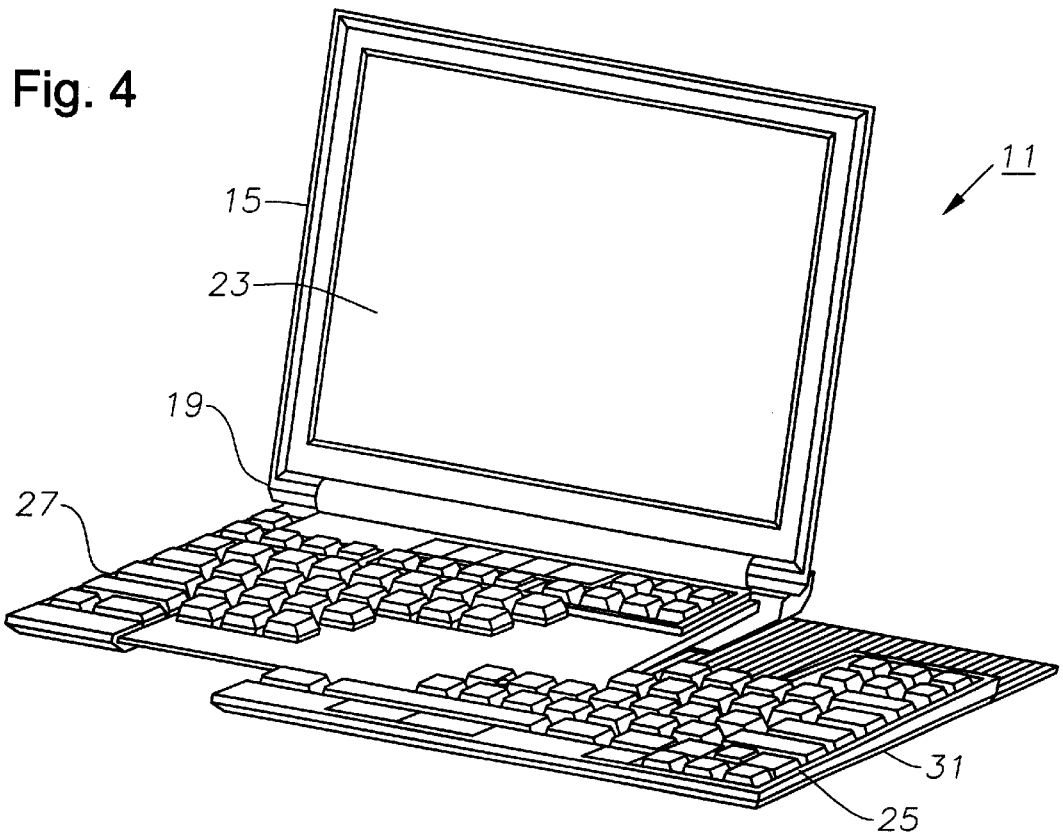
FIG. 4 is an exploded right front isometric view of the computer of FIG. 2 shown with the keyboard disassembled from a base portion.

Referring to FIG. 4, an exploded view of computer 11 is shown. In this view, portions 25, 27 are separated by a larger distance so that the basic construction can be more readily seen. This would not be a normally attainable position for computer 11. However, in this image it is clear how monitor 21 is hinged to monitor portion 27 which comprises the left-rear half of keyboard 21 plus the majority of the electronic components of computer 11 (not shown) including the processor, memory, connectors, PC-card slots, batteries, etc. By contrast, base portion 25 comprises the right-front half of keyboard 21 plus a large base plate 31 (shown with ribs) which forms virtually the entire bottom of computer 11 when it is in the closed position (FIG. 1). Portions 25, 27 are attached by one or more flex cables to connect the signals therebetween, plus those of any pointing device or switches (not shown) to the system electronics which are packaged inside monitor portion 27. In the preferred embodiment, there are mechanical linkages or guide rails (not shown) which constrain portions 25, 27 to move in a well-defined path relative to one another. Although many such linkages could be used for this purpose, one embodiment would consist of three linkages of equal length connecting portions 25, 27 in such a way that only relative motion along a circular path would be permitted. The linkages would be chosen so that the closed position, the open position and all intermediate positions would be located along the circular path.

Figure 5:
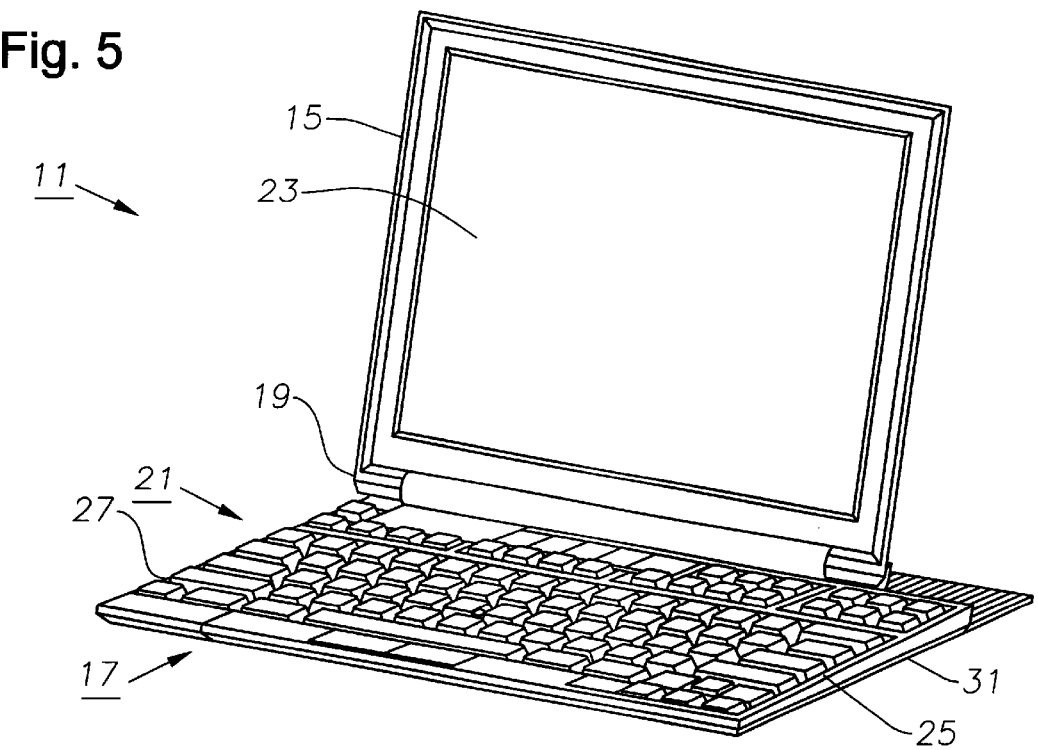
FIG. 5 is a right front isometric view of the computer of FIG. 2 shown with the keyboard fully deployed and ready for operation.

Computer 11 has a fully deployed position (FIG. 5) wherein portion 27 and cover 15 have been shifted forward by approximately 1.5 inches (or two keyboard rows) after first having been shifted to the left by approximately two inches. Portions 25, 27 are juxtaposed in a conventional keyboard alignment or pattern. In the deployed position, cover 15 and, thus, monitor 23 are positioned toward the left side of keyboard 21. However, since conventional laptop computers typically have a pointing device and the center of their "home row" of keys shifted to the left somewhat, the offset between the active center of keyboard 21 and the center of monitor 23 is no larger than the situation when the monitor is physically centered on the overall width of the keyboard. Note again that virtually all of the viewable front and top surfaces of computer 11 are occupied by keyboard 21 and monitor 23. The lack of any "wasted" space around keyboard 21 and monitor 23 makes computer 11 appear very sleek. Also, notice that front edge 17 is very thin so that keyboard 21 is vertically closer to the support surface for more comfortable typing without a palm rest. At this stage, keyboard 21 has an aspect ratio that is larger or more rectangular than the aspect ratio of monitor 23.

Figure 6:
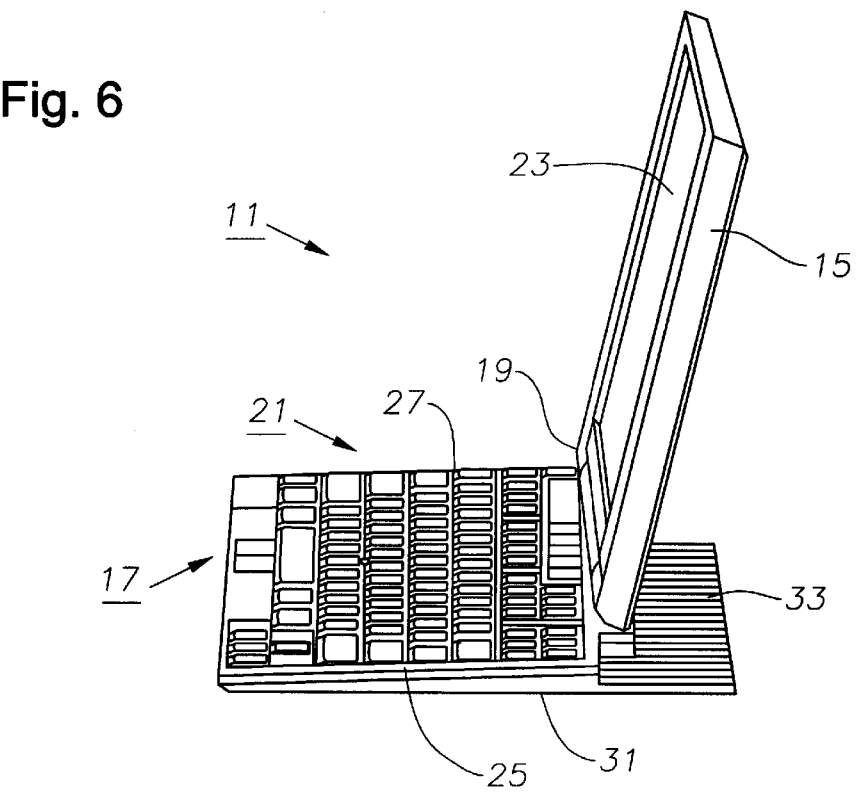
FIG. 6 is a right side isometric view of the computer of FIG. 5.

FIG. 6 is a side view of computer 11 in the deployed position. Base plate 31, which is attached to base portion 25, extends all the way to the rear of computer 11 prior to deployment (FIGS. 1 and 2). Thus, now that monitor portion 27 and cover 15 have been shifted to the left and forward, the hinge of cover 15 is now located about 1.5 inches forward from the back edge of base plate 31. Thus, the rearward portion of base plate 31 now acts as a stationary, extended support foot 33, which makes computer 11 much less prone to tipping over. Support foot 33 extends rearward of the rearward edge of the main body of the base portion 25 and hinge 19. In the embodiment shown, support foot 33 is integrally formed with and extends continuously from base plate 31.

In many traditional notebook computer designs, heavy components such as the batteries are placed near the front of the machine so that the system will not tip backwards when the rather heavy display is opened more than 90 degrees. Unfortunately, placing the batteries near the front of the machine makes it difficult to keep the front of machine very thin to locate the keyboard vertically closer to the support surface. In contrast, the larger, heavier components of computer 11 are located in back near the hinge of cover 15 to keep the front edge 17 very thin. In a traditional machine, positioning the heavy elements near the display hinge would result in a machine that tends to tip over when the display is opened up beyond 90 degrees. In this design, however, the location of the stationary support foot 33 behind hinge 19 prevents computer 11 from tipping over backwards, even if batteries and other heavy components are all positioned towards the back of the machine, near hinge 19.

Figure 7:
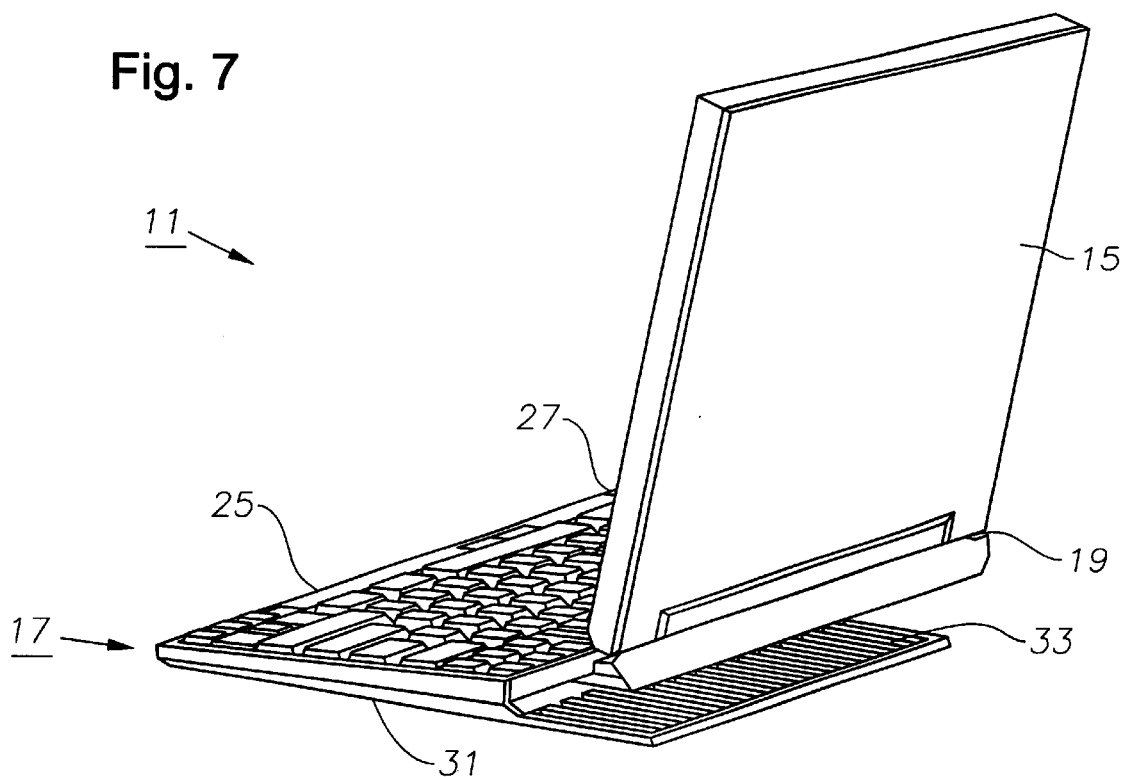
FIG. 7 is a right rear isometric view of the computer of FIG. 5.
Figure 8:
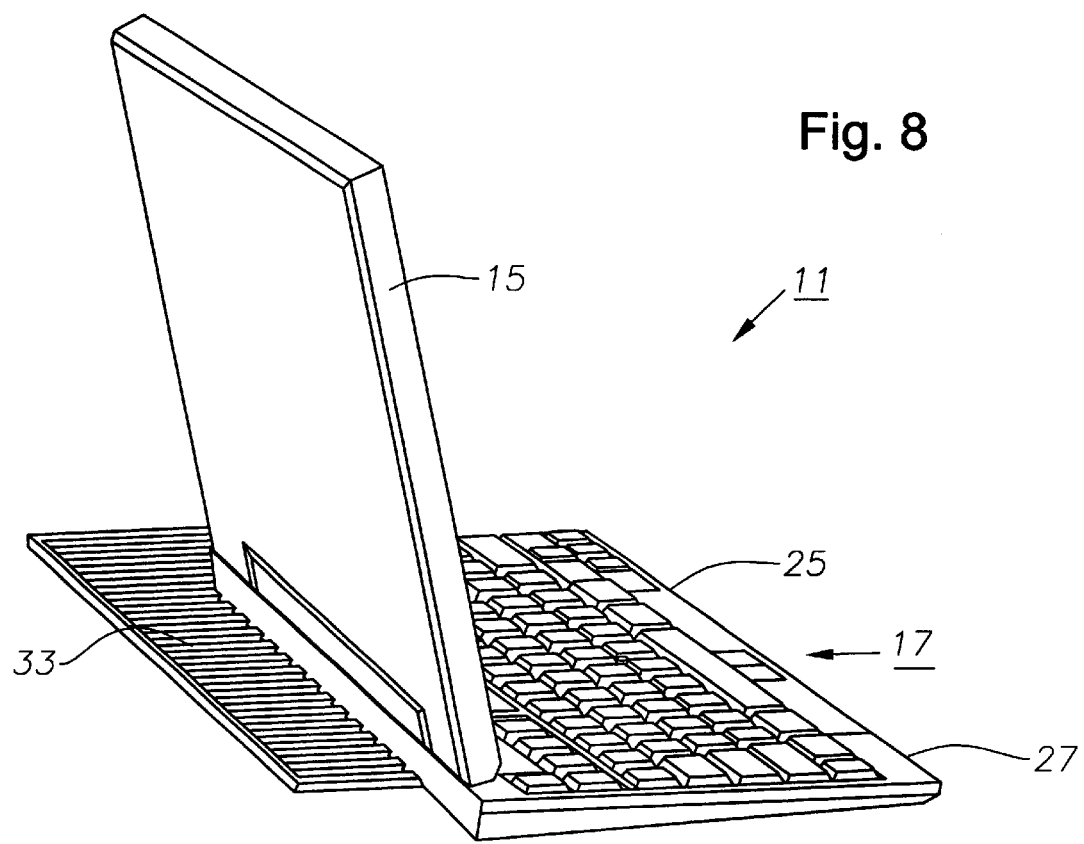
FIG. 8 is a left rear isometric view of the computer of FIG. 5.
Figure 9:
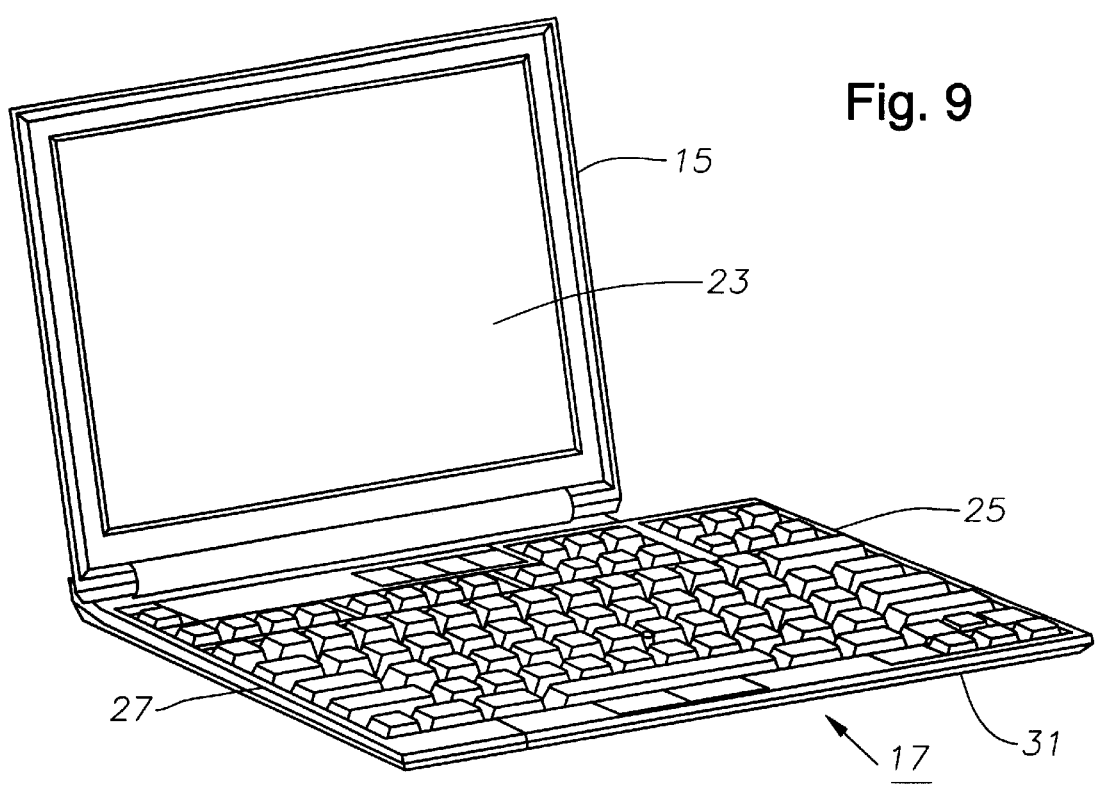
FIG. 9 is a left front isometric view of the computer of FIG. 5.

FIGS. 7–9 further illustrate the unique configuration, appearance and construction of computer 11. Note in particular that, in the deployed position, computer 11 has several asymmetric features. The left side edge of keyboard 21 aligns with the left side edge of cover 15, but the right side edge of keyboard 21 extends beyond the right side edge of cover 15. In contrast, the right side edge of support foot 33 aligns with the right side edge of keyboard 21, but the left side edge of keyboard 21 extends beyond the left side edge of support foot 33. From the viewing angle provided by FIG. 9, support foot 33 is basically not visible, and the user only sees a distinctive, asymmetric system made up almost entirely of keyboard 21 and monitor 23. Despite these asymmetries, the center of keyboard 21 is slightly to the left and substantially aligned with the center of monitor 23. In contrast, the displays of prior art (symmetric) machines are often positioned to the right of the center of the keyboard. By moving the display to the left in the present design, further misalignment is avoided.

The invention has several advantages. The segmented, deployable keyboard allows the computer to have a smaller overall size when not in use. The keyboard may be deployed manually or automatically. The manually-deployed embodiment is less expensive than its automatic predecessor since it does not require an automatic deployment mechanism. Furthermore, this lack of an automatic deployment mechanism means that the design does not require a strong and rigid chassis structure, as did the original design. The use of a foot support at the rear of the machine increases the stability of the machine and allows its center of gravity to be moved away from the front, making this computer less prone to tipping over. The rear-side center of gravity allows the front of the machine to have a very thin profile. A thinner profile makes typing on a desk or other surface more comfortable and a palm rest unnecessary. This new design also permits the display monitor to move with part of the keyboard and be located much closer to the user. This is particularly useful when the computer is to be operated in cramped locations, such as on an airline tray table. With the front edge of the keyboard being substantially aligned with the front edge of the machine, there is virtually no "wasted" space (unused horizontal surface area) visible around the keyboard and in front of the display (i.e. the user only sees keyboard and display).

While the invention has been shown or described in only some of its forms, it should be apparent to those skilled in the art that it is not so limited, but is susceptible to various changes without departing from the scope of the invention.

I claim:

1. A notebook computer, comprising:
a base having an upper surface, a front edge, a rear edge, two side edges, a longitudinal axis from the front edge to the rear edge, and a lateral axis between the two side edges, the longitudinal axis being perpendicular to the lateral axis;
a display having a hinge pivotally mounted adjacent to the rear edge of the base, the display being movable about the hinge between open and closed positions relative to the base, and having a conventional aspect ratio of approximately 4 to 3;
a keyboard on the upper surface of the base and having a plurality of keys arranged in a generally rectangular configuration with a front edge row of keys, a rear edge row of keys and two side edge rows of keys, the keyboard also having an approximately equal amount of surface area as the display; wherein
each of the front edge and side edge rows of keys are substantially flush with the front edge and side edges of the base, respectively, and the rear edge row of keys is substantially flush with the hinge of the display, such that the upper surface of the base is substantially void of any unused surface area; and wherein
when the display is in the closed position, the keyboard has an aspect ratio which is substantially equal to the aspect ratio of the display, and when the computer is in operation, the keyboard has an aspect ratio which is substantially larger than the aspect ratio of the display; and
a support foot mounted to the base such that, when the computer is in operation, the support foot extends rearward of the rear edge of the base and the hinge of the display, wherein the support foot comprises a platform integrally formed with and extending continuously from the base.

2. The computer of claim 1 wherein, when the computer is in operation, a first side edge of the support foot is substantially flush with one of the side edges of the base, and a second side edge of the support foot is spaced apart from the other of the side edges of the base, such that the support foot is asymmetric with the base.

3. The computer of claim 1 wherein, when the computer is in operation, a first side edge of the display is substantially flush with one of the side edges of the base, and a second side edge of the display is spaced apart from the other of the side edges of the base, such that the display is asymmetric with the base.

4. The computer of claim 3 wherein, when the display is in the closed position, a center of the keyboard is approximately aligned with a center of the display.

5. The computer of claim 1 wherein the base comprises a first portion containing some of the keys of the keyboard and a second portion containing the remaining keys of the keyboard, and wherein the first portion is movable relative to the second portion to provide the keyboard with a larger aspect ratio when the computer is in use.

6. The computer of claim 5 wherein the computer has a retracted position wherein the first and second portions of the base are aligned with side edges of the display, and a deployed position wherein one of the first and second portions of the base extends substantially beyond one of the side edges of the display.

7. The computer of claim 5 wherein the first portion is movable laterally and longitudinally relative to the second portion.

8. The computer of claim 5 wherein the first portion is movable in a forward direction relative to the second portion.

9. The computer of claim 1 wherein the base, display and keyboard are symmetrical when the display is in the closed position, and asymmetrical when the computer is in operation.

10. The computer of claim 1 wherein the base tapers smoothly in a wedge-like shape, such that the front edge of the base is substantially shorter in height than a rear edge of the base.

11. A notebook computer, comprising:
a base plate having a front edge, a rear edge, and two side edges;
a stationary base portion mounted stationarily to the base plate;
a stationary keyboard portion located on the stationary base portion;
a movable base portion slidably mounted on the base plate;
a movable keyboard portion mounted on the movable base portion for movement therewith;
a display secured by a hinge to the movable base portion for movement therewith; wherein
the movable base portion is movable between a retracted position wherein the keyboard portions are misaligned, and a deployed position wherein the keyboard portions are juxtaposed in a conventional keyboard pattern; and wherein
the movable base portion also slides laterally and forward when moved from the retracted position to the expanded position.

12. A notebook computer, comprising:
a base plate having a front edge, a rear edge, and two side edges;
a stationary base portion mounted stationarily to the base plate;
a stationary keyboard portion located on the stationary base portion;
a movable base portion slidably mounted on the base plate;
a movable keyboard portion mounted on the movable base portion for movement therewith;
a display secured by a hinge to the movable base portion for movement therewith; wherein
the movable base portion is movable between a retracted position wherein the keyboard portions are misaligned, and a deployed position wherein the keyboard portions are juxtaposed in a conventional keyboard pattern; and wherein
a portion of the base plate covered by the movable base portion is covered while in the retracted position, and the portion of the base plate is exposed when the movable base portion is in the deployed position to define a support foot which protrudes rearward from the stationary base portion.

13. A notebook computer, comprising:
a keyboard having a plurality of keys arranged in a generally rectangular configuration;
a base having an upper surface for supporting the keyboard, a front edge, a rear edge, two side edges, a stationary portion containing some of the keys of the keyboard and a movable portion containing the remaining keys of the keyboard, the movable portion being movable relative to the stationary portion from a retracted position to provide the keyboard with a smaller aspect ratio when the computer is not in use, to a deployed position to provide the keyboard with a larger aspect ratio when the computer is in use;

a display having a hinge pivotally mounted to the movable portion of the base for movement therewith, the display being movable about the hinge between open and closed positions relative to the base; and a support foot mounted to the base and extending rearward of the rear edge of the base and the hinge of the display when the computer is in the deployed position, and the support foot being hidden from view when the computer is in the retracted position.

14. The computer of claim 13 wherein, when the computer is in the deployed position, a first side edge of the support foot is substantially flush with one of the side edges of the base, and a second side edge of the support foot is spaced apart from the other of the side edges of the base, such that the support foot is asymmetric with the base.

15. The computer of claim 13 wherein, when the computer is in the deployed position, a first side edge of the display is substantially flush with one of the side edges of the base, and a second side edge of the display is spaced apart from the other of the side edges of the base, such that the display is asymmetric with the base.

16. The computer of claim 15 wherein, when the computer is in the retracted position, a center of the keyboard is approximately aligned with a center of the display.

17. The computer of claim 13 wherein, when the computer is in the retracted position, the stationary and movable portions of the base are aligned with side edges of the display, and when the computer is in the deployed position, the stationary portion of the base extends substantially beyond one of the side edges of the display.

18. The computer of claim 13 wherein the base, display and keyboard are symmetrical when the display is in the closed position, and asymmetrical when the computer is in operation.

19. The computer of claim 13 wherein the base tapers smoothly in a wedge-like shape, such that the front edge of the base is substantially shorter in height than a rear edge of the base.

* * * * *